United States Patent
Eckardt

(10) Patent No.: US 11,310,622 B2
(45) Date of Patent: Apr. 19, 2022

(54) INTEGRATED SUBSCRIBER IDENTITY MODULE HAVING A CORE OS AND AN APPLICATION OS

(71) Applicant: GIESECKE+DEVRIENT MOBILE SECURITY GMBH, Munich (DE)

(72) Inventor: Stefan Eckardt, Mammendorf (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 753 days.

(21) Appl. No.: 16/320,309

(22) PCT Filed: Jul. 27, 2017

(86) PCT No.: PCT/EP2017/000912
§ 371 (c)(1),
(2) Date: Jan. 24, 2019

(87) PCT Pub. No.: WO2018/019424
PCT Pub. Date: Feb. 1, 2018

(65) Prior Publication Data
US 2019/0272377 A1    Sep. 5, 2019

(30) Foreign Application Priority Data
Jul. 28, 2016   (DE) ................... 10 2016 009 232.7

(51) Int. Cl.
*G06F 21/00*    (2013.01)
*H04W 4/00*    (2018.01)
(Continued)

(52) U.S. Cl.
CPC ............ *H04W 4/00* (2013.01); *G06F 21/575* (2013.01); *H04W 4/60* (2018.02); *H04W 8/183* (2013.01);
(Continued)

(58) Field of Classification Search
None
See application file for complete search history.

(56) References Cited

U.S. PATENT DOCUMENTS

| 8,484,452 B2 | 7/2013 | Motohama et al. |
| 2006/0282899 A1 | 12/2006 | Raciborski |
| (Continued) | | |

FOREIGN PATENT DOCUMENTS

| WO | 2013188830 A1 | 12/2013 |
| WO | 2014036021 A1 | 3/2014 |
| WO | 2014198340 A1 | 12/2014 |

OTHER PUBLICATIONS

Palattella, Maria Rita et al. Internet of Things in the 5G Era: Enablers, Architecture, and Business Models. IEEE Journal on Selected Areas in Communications, vol. 34, Issue: 3. https://ieeexplore.ieee.org/stamp/stamp.jsp?tp=&arnumber=7397856 (Year: 2016).*

(Continued)

*Primary Examiner* — Jeremiah L Avery
(74) *Attorney, Agent, or Firm* — Workman Nydegger

(57) ABSTRACT

A chipset for a mobile radio-enabled end device is provided in which an integrated subscriber identity module is arranged in a secure processor of the chipset, and in which an operating system of the secure processor is arranged or arrangeable. The operating system comprises a core OS and an application OS, wherein the application OS comprises a core OS verification apparatus which is arranged to verify the integrity of the core OS upon it being put into operation and to continue the putting into operation at most only in the case of a successful verification of the core OS and to cause a fault measure and/or to interrupt or terminate the putting into operation in the case of an unsuccessful verification.

9 Claims, 2 Drawing Sheets

(51) Int. Cl.
*H04W 4/60* (2018.01)
*G06F 21/57* (2013.01)
*H04W 8/18* (2009.01)
*H04W 12/10* (2021.01)
*H04W 12/03* (2021.01)
*H04W 12/37* (2021.01)
*H04W 12/069* (2021.01)

(52) U.S. Cl.
CPC ......... *H04W 12/03* (2021.01); *H04W 12/069* (2021.01); *H04W 12/10* (2013.01); *H04W 12/37* (2021.01)

(56) References Cited

U.S. PATENT DOCUMENTS

| | | | |
|---|---|---|---|
| 2008/0282345 A1 | 11/2008 | Beals | |
| 2012/0047551 A1* | 2/2012 | Pattar | H04W 4/70 726/1 |
| 2012/0185680 A1 | 7/2012 | Buer | |
| 2012/0255017 A1 | 10/2012 | Sallam | |
| 2012/0290870 A1* | 11/2012 | Shah | G06F 21/575 714/4.11 |
| 2015/0033312 A1* | 1/2015 | Seed | H04L 63/08 726/7 |
| 2015/0334554 A1* | 11/2015 | Song | H04W 8/205 455/558 |
| 2017/0331577 A1* | 11/2017 | Parkvall | H04L 5/0053 |
| 2017/0364685 A1* | 12/2017 | Shah | G06F 21/53 |

OTHER PUBLICATIONS

Vohra, Deepak et al. Investigating GSM Control Channels with RTL-SDR and GNU Radio. 2016 International Conference on Wireless Communications, Signal Processing and Networking (WiSPNET). https://ieeexplore.ieee.org/stamp/stamp.jsp?tp=&arnumber=7566288 (Year: 2016).*
German Office Action from DE Application No. 102016009232.7, dated Jul. 26, 2017.
International Search Report from PCT Application No. PCT/EP2017/000912, dated Nov. 2, 2017.
"3rd Generation Partnership Project; Technical Specification Group Core Network and Terminals; Characteristics of the Universal Subscriber Identity Module (USIM) Application," 3GPP TS 31.102 V14.3.0, Jun. 2017, 289 Pages.
"Smart Cards; UICC-Terminal Interface; Physical and Logical Characteristics," ETSI TS 102 221 V14.0.0, Feb. 2017, 190 Pages.

* cited by examiner

A-OS: APDU Authenticate<Core-OS> 2

A-OS: CoreOS list
{hashCoreOS1, hashCoreOS2, hash CoreOS3}
Hash <ImCoreOS1> =? € CoreOS list ? => OK
Hash <ImCoreOS5> =? € CoreOS list ? => XXX A-OS: Certlist (OS)
{CertOS1, CertOS2, CertOS3}
CertOS1 =? € Certlist (OS) ? => OK
CertOS5 =? € Certlist (OS) ? => XXX

INTEGRATED SUBSCRIBER IDENTITY MODULE HAVING A CORE OS AND AN APPLICATION OS

FIELD OF THE INVENTION

The invention relates to a chipset for a mobile radio-enabled end device in which in a secure processor of the chipset there is arranged an integrated subscriber identity module in which an operating system of the secure processor is arranged or arrangeable, the operating system comprising a core OS and an application OS.

PRIOR ART

The world is interconnected by a mobile network, and the mobile networking continues to progress. Mobile radio-enabled end devices communicate via mobile radio networks. The classic mobile radio-enabled end devices include the mobile end devices such as smartphones and mobile phones and mobile radio-enabled tablets. Mobile radio-enabled end devices further include regulation devices (control devices or measuring devices or combined control/measuring devices) for industrial apparatuses in a commercial or private environment. Industrial apparatuses are, for example, production facilities that have one or more regulation devices (end devices) which can communicate with a background system and/or one another via a mobile radio network. Further industrial apparatuses are smart home apparatuses such as e.g. heating systems or current consumers with end devices in the form of regulation devices.

The end device has a chipset with one or more end device chips for the operation of functions of the end device. Present (and older) smartphones typically have for example a chipset which comprises at least three end device chips, namely a transceiver IC which performs the physical radio communication, a baseband processor BB (or equivalent modem) which performs functions for data transmission via radio communication at protocol level, and an application processor AP on which the operating system and application software, e.g. applications (e.g. apps), are executed. As further end device chips there can be provided transceiver ICs for other radio channels, in particular for short-range radio channels such as NFC (NFC: near field communication) or Bluetooth. On the chipset, in particular on the application processor AP there is implemented firmware, i.e. special software that realizes basic functionalities of the chipset. The firmware includes e.g. the operating system of the application processor and possibly the operating system of further processors having an operating system, hardware-related software e.g. of the transceiver IC and of the baseband processor BB, and in some cases programming interfaces (APIs).

For using a mobile radio-enabled end device, such as a smartphone, mobile phone, in a mobile radio network of a network operator, the end device contains a subscriber identity module with a subscription profile, or profile for short. The profile manages the configuration of the end device and the connection of the end device in the mobile network. The profile is formed by a structured data set which enables the establishment, operation and clearing of a connection of the end device in the mobile network and comprises, for example, a cryptographic authentication key Ki and an international mobile subscriber identity IMSI.

The subscriber identity module may be conventionally integrated in carriers of different form factors, in particular plug-in and embedded carriers. Subscriber identity modules in carriers of the form factor plug-in (e.g. classic SIM card) and embedded (module provided for soldering into an end device) are arranged on a dedicated, separate chip or SoC (system on chip).

A more recent concept for the form factor of a subscriber identity module are integrated subscriber identity modules which are integrated on an end device chip or SoC (system on chip) of the end device, i.e. do not have their own chip. Integrated subscriber identity modules are furnished with the prefix "integrated" or "i" and are referred to as integrated UICC, iUICC, iSIM or iUSIM, for example. With this concept, the integrated subscriber identity module is integrated as a secure processor in a different end device chip, e.g. in the baseband processor or the application processor. The secure processor can be configured e.g. as an ARM SC300 core or comparable secure processor with a high security level. A disadvantage of such a secure processor is that any memory space involves high costs due to the security measures, so that the memory available in the secure processor is usually kept as low as possible. In order to alleviate the problem of low memory space in the secure processor, the iUICC concept generally proposes to provide an external non-volatile memory in the chipset which is located outside the secure processor but within the chipset, in which memory contents are stored in a secured way, e.g. encrypted, such that only the secure processor can use them.

The secure processor has an operating system which, functionally, is configured identically with or comparably to a SIM card operating system or is analogous thereto. The secure processor operating system for example is basically configured in accordance with a telecommunication standard such as ETSI TS 102 221 or 3GPP TS 31.102, according to which a file system is provided in the secure processor and authentication measures are provided.

SIM card operating systems are certified by the manufacturer or issuer, so that customers can be offered a verifiable security level. The process of certifying a SIM card operating system is elaborate. Therefore, for practical reasons, a SIM card operating system is divided into a core OS and an application OS. The core OS comprises basic functionalities, in particular functionalities for controlling the physical elements of the chip, e.g. the memory cells of the underlying semiconductor material, of the SIM card. The application OS comprises application-oriented functionalities of the SIM card, e.g. functionalities for addressing the file system and for performing authentications. The core OS is usually created and certified by the semiconductor manufacturer. The application OS is usually created and certified by a SIM card manufacturer or issuer.

SUMMARY OF THE INVENTION

The invention is based on a chipset for a mobile radio-enabled end device. In the chipset, in a secure processor of the chipset there is arranged an integrated subscriber identity module which enables the use of subscription profiles. The data records of usable subscription profiles do not necessarily have to be stored permanently in the secure processor, but can also lie in an external NVM of the chipset which will be explained later. The profiles only have to be executable in the secure processor. An operating system of the secure processor is arranged or arrangeable in the secure processor. The operating system comprises a core OS (core operating system) and an application OS (application operating system), or consists of exactly these two operating system components core OS and application OS. The invention is based on the object of stating a chipset in which a manufacturer, issuer or supplier of the application OS has the possibility of checking the trustworthiness of a core OS which it takes over from another manufacturer, issuer or supplier and, if needed, protecting its own application OS from untrustworthy core OS.

This object is achieved by a chip set according to claim 1. Advantageous embodiments of the invention are stated in dependent claims.

The inventive chipset according to claim 1 is characterized in that the application OS comprises a core OS verification apparatus which is arranged to verify the integrity of the core OS upon it being putting into operation and to continue the putting into operation at most only in the case of a successful verification of the core OS and to cause a fault measure and/or to interrupt or terminate the initial operation in the case of an unsuccessful verification.

Due to the core OS verification apparatus, the application OS (application operating system portion) has the possibility to use dubious, expressly prohibited or untrustworthy core OS (e.g. those of other or prohibited manufacturers, issuers, or suppliers) as an opportunity to no longer continue the execution and to thereby protect the application OS itself from the core OS.

Thus, according to claim 1, a chipset with a secure processor with an operating system divided into application OS and core OS is created in which a manufacturer, issuer or supplier of the application OS has the possibility to check the trustworthiness of a core OS which it takes over from another manufacturer, issuer or provider and, if needed, to protect its own application OS from untrustworthy core OS.

According to a preferred embodiment of the invention, the chipset further comprises a bootloader that is arranged to directly or indirectly enforce that upon it being put into operation the application OS applies the core OS verification apparatus in order to verify the integrity of the core OS.

The chipset further comprises, according to another preferred embodiment of the invention: —an internal secure working memory exclusively assigned to the secure processor; —an external non-volatile memory located in the chipset but outside the secure processor, in which a—preferably encrypted—memory image of the core OS is stored; —a bootloader implemented in the secure processor, which is arranged to load the core OS from the external non-volatile memory into the internal secure working memory, to decrypt it where applicable, and to thereby put it into operation. The embodiment with the bootloader has the additional advantage that when the chipset is booted, the core OS is called up directly by the bootloader without any possibility of influencing it from outside the chipset, so that a bypassing of the core OS is impossible.

According to another preferred embodiment of the invention, the chipset further comprises: —an internal secure working memory exclusively assigned to the secure processor; —an external non-volatile memory located in the chipset but outside the secure processor, in which a—preferably encrypted—memory image of the application OS is stored; —a bootloader implemented in the secure processor, which is arranged to load the application OS from the external non-volatile memory into the internal secure working memory, to decrypt it where applicable, and to thereby put it into operation in the internal secure working memory. The embodiment with the bootloader has the additional advantage that when the chipset is booted the application OS is called up directly by the bootloader without any possibility of influencing it from outside the, so that it is impossible to bypass the application OS and to possibly incorporate another application OS.

Selectively, the memory image of the core OS or the memory image of the application OS is stored encrypted in the external non-volatile memory and can be brought to execution exclusively by the secure processor, but not e.g. in the general working memory ext RAM.

Selectively, the chipset further comprises: —an external non-volatile memory located in the chipset but outside the secure processor, in which a—preferably encrypted—memory image of the core OS is stored; the application OS being arranged to verify the integrity of the memory image of the core OS.

The core OS verification apparatus according to the invention is selectively configured to calculate a checksum or a hash value over the core OS memory image stored in the external non-volatile memory and to verify that it matches or corresponds to a checksum or a hash value from a list of checksums or hash values of admissible or approved core OS.

The list of the admissible or approved core OS is selectively stored in the chipset. Alternatively, the list is stored at an external server. The list can also be stored both in the chipset and at an external server, the lists in the chipset and at the external server being synchronized as needed.

Selectively, the core OS verification apparatus is arranged to verify the integrity of the core OS by means of a certificate issued by a trustworthy external entity, in particular against a list of admissible core OS.

BRIEF DESCRIPTION OF THE DRAWINGS

In the following, the invention is explained in more detail on the basis of exemplary embodiments and with reference to the drawings, in which there are shown.

DETAILED DESCRIPTION OF EMBODIMENT EXAMPLES

Figure 1:
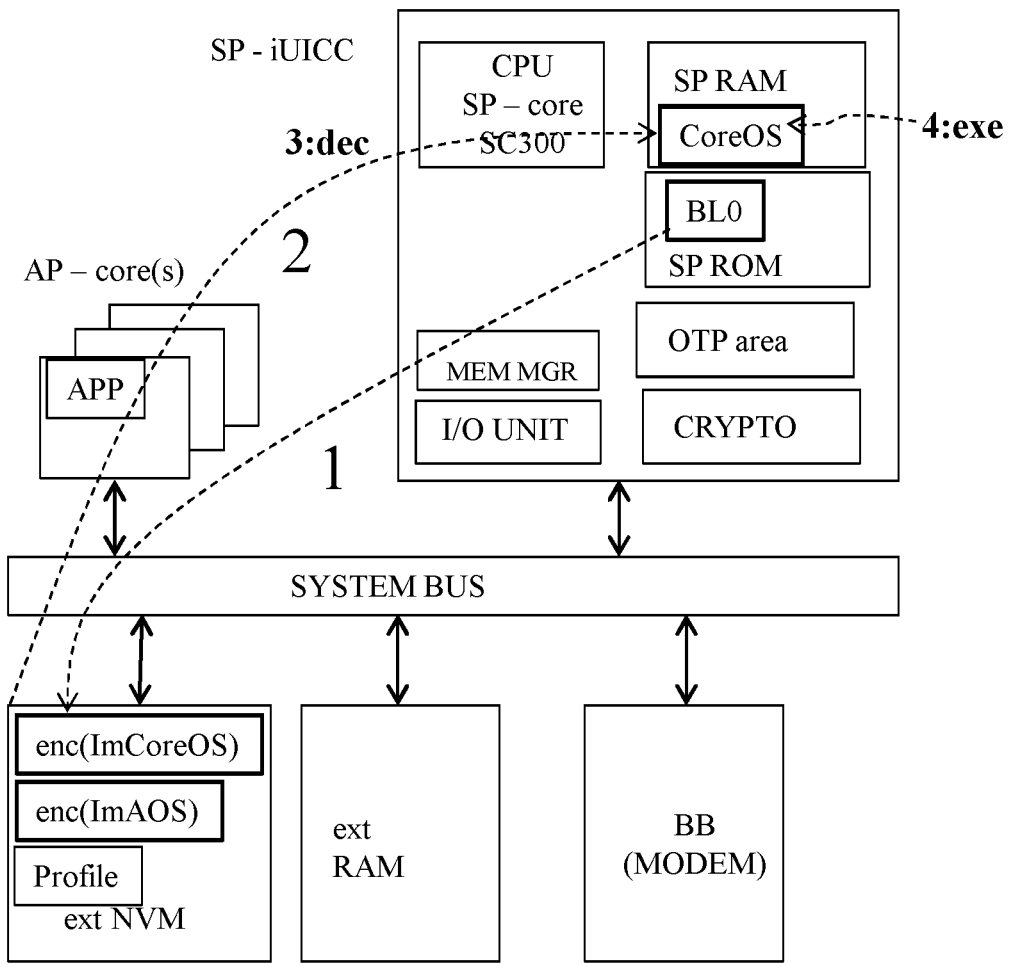
FIG. 1 in a schematic representation, a chipset according to an embodiment of the invention, with a core OS being put into operation by a bootloader.

FIG. 1 shows, in a schematic representation, a chipset according to an embodiment of the invention, with a core OS being put into operation by a bootloader.

The chipset comprises a secure processor SP which, among other things, fulfils the function of an integrated subscriber identity module iUICC. The secure processor SP has a CPU or—equivalent—a processor core, a memory manager MEM MGR, an interface I/O unit, an internal working memory SP RAM exclusively allocated to the secure processor SP, an internal exclusive permanent memory SP ROM of the secure processor SP (the ROM is optional, instead only flash memory can be provided), a comparatively small specifically safeguarded permanent memory OTP area (in memory technology realized e.g. as ROM, EEPROM or Flash), and a crypto unit CRYPTO, e.g. a crypto coprocessor.

The chipset further comprises an application processor AP with—here several—processor cores. In the application processor AP applications are implemented as APPs.

The chipset further comprises an external non-volatile memory ext NVM, in which an encrypted memory image or—equivalent—image enc(ImCoreOS) of a core OS is stored. Furthermore, in the ext NVM there is stored a memory image or—equivalent—image enc(ImAOS) of an application OS. Furthermore, in the external non-volatile memory ext NVM there are stored one or more encrypted subscription profiles.

The chipset additionally comprises an external working memory ext RANI generally accessible in the chip set and a baseband processor BB (modem).

The components SP, AP, ext NVM, ext RAM, BB of the chipset are interconnected via a system bus.

In the following, a method for putting into operation the core OS by the bootloader BL0 is described with reference to FIG. 1.

The operation of the chipset is started. If the chipset is mounted in a smartphone, the operation of the chipset is started e.g. by switching on the smartphone with the standard power switch.

By starting the chipset, the bootloader BL0 is started. The bootloader (steps 1+2) loads the encrypted memory image enc(ImCoreOS) of the core OS from the external non-volatile memory ext NVM into the internal exclusive working memory SP RAM of the secure processor SP, (step 3: dec) decrypts the memory image, and (step 4: exe) brings the core OS in the internal exclusive working memory SP RAM of the secure processor SP to execution.

Figure 2:
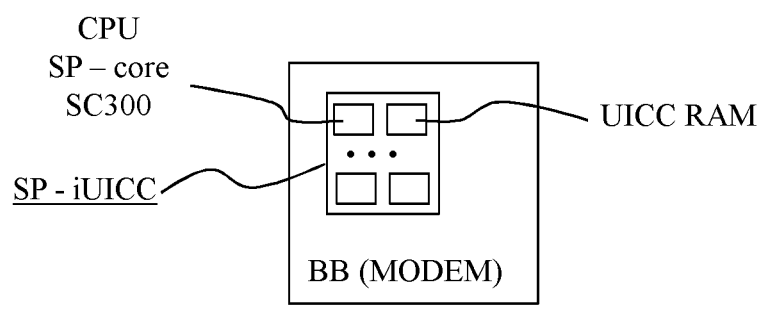
FIG. 2 an embodiment of an inventive chipset in which the secure processor is directly integrated into the baseband controller.

According to FIG. 1, the secure processor SP is represented as an independent processor. FIG. 2 shows a preferred embodiment of an inventive chipset in which the secure processor SP is directly integrated into the baseband controller BB of the chipset. Otherwise the chip set and in particular the secure processor SP can be identical to FIG. 1.

Figures 3, 4:
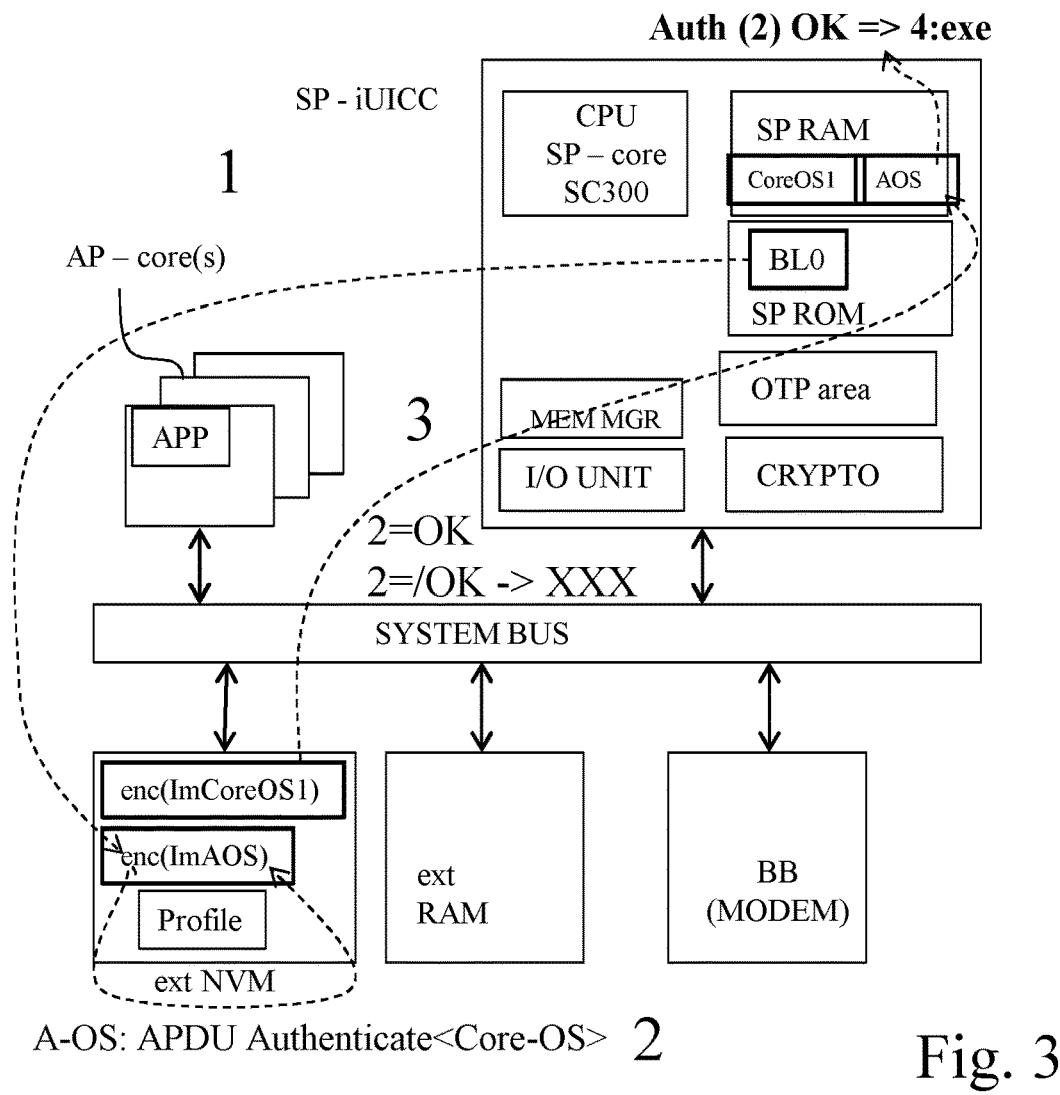
FIG. 3 the chipset of FIG. 1 showing an application OS being put into operation by the bootloader and an authentication/verification of the core OS by the application OS.
FIG. 4 the authentication/verification of the core OS by the application OS, as shown in FIG. 3, in detail.

FIG. 3 shows the chipset of FIG. 1 with an application OS being put into operation by the bootloader BL0 and an authentication/verification of the core OS by the application OS AOS.

Referring to FIG. 3, a method for the verification of the core OS by the application OS upon the application OS being put into operation by the bootloader BL0 is described hereinafter. (Step 1): The bootloader BL0 calls up the encrypted memory image enc(ImAOS) of the application OS AOS in the external non-volatile memory ext NVM for execution. By calling up the application OS AOS an authentication/verification of the core OS by the application OS AOS is caused (triggered). The details of authentication/verification are explained below with reference to FIG. 4. Upon a successful authentication/verification of the core OS by the application OS, the memory image enc(ImAOS) of the application OS is decrypted (step 3: dec) and brought to execution (step 4: exe) in the internal working memory SP RAM of the secure processor SP. If the authentication/verification of the core OS by the application OS carried out in step 2 ends with a result "not successfully verified/authenticated", the application OS AOS is not brought to execution.

FIG. 4 shows, in the method of FIG. 3, the details of the authentication/verification of the core OS by the application OS, according to two embodiments of the invention.

According to a first embodiment, accessible to the application OS, a list CoreOS list of hash values with approved Cores OS is stored in a memory accessible to the application OS, e.g. directly in the ext NVM, or alternatively on an external server which the application OS can access. The list contains hash values hashCoresOS1, hashCoresOS2, hashCoresOS3 of three admissible core operating systems CoreOS1, CoreOS2 and CoreOS3. In the example of FIG. 3, in the ext NVM, the memory image enc(ImCoreOS1) of the CoreOS1 (one) is stored, i.e. an approved CoreOS. The secure processor SP calculates a hash value over the actually present CoreOS1 and compares it with the hash values stored in the CoreOS list. Since hashCoreOS1 is in the list, the hash values are identical, therefore the authentication/verification of the core OS by the application OS will end with a result "successfully verified/authenticated" and, in the method according to FIG. 3, the application OS will be brought to execution. If a CoreOS7 (seven) were stored in the ext NVM and a hash value was calculated via CoreOS7, there will be no corresponding hash value in the list CoreOS list. The authentication/verification of the core OS by the application OS would end with a result "not successfully verified/authenticated" and, in the method according to FIG. 3, the application OS would not be brought to execution.

According to a second embodiment, accessible to the application OS, a list Certlist of certificates Cert=S1, CertOS2, CertOS3 of approved Cores OS CoreOS1, CoreOS2, CoreOS3 is stored in a memory accessible to the application OS, e.g. directly in the ext NVM, or alternatively on an external server which the application OS can access. The list Certlist of certificates is analogous to the list CoreOS list of hash values, except that instead of hash values certificates of approved core OS are stored. In this embodiment, the actually present Core OS1 has a certificate CertOS1 assigned to it. Accordingly, upon authentication/verification of the core OS by the application OS, the certificate of the actually present core OS is checked. If the ext NVM contains the approved CoreOS1, the application OS will be brought to execution. If the ext NVM contains the unknown or non-approved CoreOS5 which is not in the certificate list Certlist, the application OS, here CoreOS5, will not be brought to execution.

The invention claimed is:

1. A Chipset for a mobile radio-enabled end device, in which an integrated subscriber identity module is arranged in a secure processor of the chipset and in which an operating system of the secure processor is arranged or arrangeable, the operating system comprising a core OS and an application OS;
   wherein the application OS comprises a core OS verification apparatus which is arranged to verify the integrity of the core OS upon the putting into operation of the application OS and to continue the putting into operation of the application OS at most only in the case of a successful verification of the core OS and to cause a fault measure and/or to interrupt or terminate the putting into operation of the application OS in the case of an unsuccessful verification.

2. The chipset according to claim 1, further comprising:
   a bootloader implemented in the secure processor, which is arranged to directly or indirectly enforce that the application OS applies the core OS verification apparatus upon it being put into operation in order to verify the core OS.

3. The chipset according to claim 1, further comprising:
   an internal secure working memory exclusively assigned to the secure processor;
   an external non-volatile memory located in the chipset but outside the secure processor, in which an encrypted memory image of the core OS is stored;

a bootloader implemented in the secure processor, which is arranged to load the core OS from the external non-volatile memory into the internal secure working memory, to decrypt it where applicable, and to put it into operation in the internal secure working memory.

4. The chipset according to claim 1, further comprising:

an internal secure working memory exclusively assigned to the secure processor;

an external non-volatile memory located in the chipset but outside the secure processor, in which an encrypted memory image of the application OS is stored;

a bootloader implemented in the secure processor, which is arranged to load the application OS from the external non-volatile memory into the internal secure working memory, to decrypt it where applicable, and to put it into operation in the internal secure working memory.

5. The chipset according to claim 1, wherein the memory image of the core OS or the memory image of the application OS is stored encrypted in the external non-volatile memory and can be brought to execution exclusively by the secure processor.

6. The chipset according to claim 1, further comprising:

an external non-volatile memory located in the chipset but outside the secure processor, in which an encrypted memory image of the core OS is stored;

wherein the application OS is arranged to verify the memory image of the core OS for integrity.

7. The chipset according to claim 6, wherein the core OS verification apparatus is arranged to calculate a checksum or hash value over the memory image of the core OS stored in the external non-volatile memory and to verify that it matches or corresponds to a checksum or a hash value from a list of checksums or hash values of admissible core OS.

8. The chipset according to claim 7, wherein the list is stored:
   in the chipset; or
   at an external server; or
   both in the chipset and at an external server, the lists in the chipset and at the external server being synchronized with each other as needed.

9. The chipset according to claim 1, wherein the core OS verification apparatus is arranged to verify the integrity of the core OS by means of a certificate issued by a trustworthy external entity, against a list of admissible core OS.

* * * * *